Jan. 30, 1940. P. H. WAGNER 2,188,745
OIL FILTER
Filed April 20, 1938
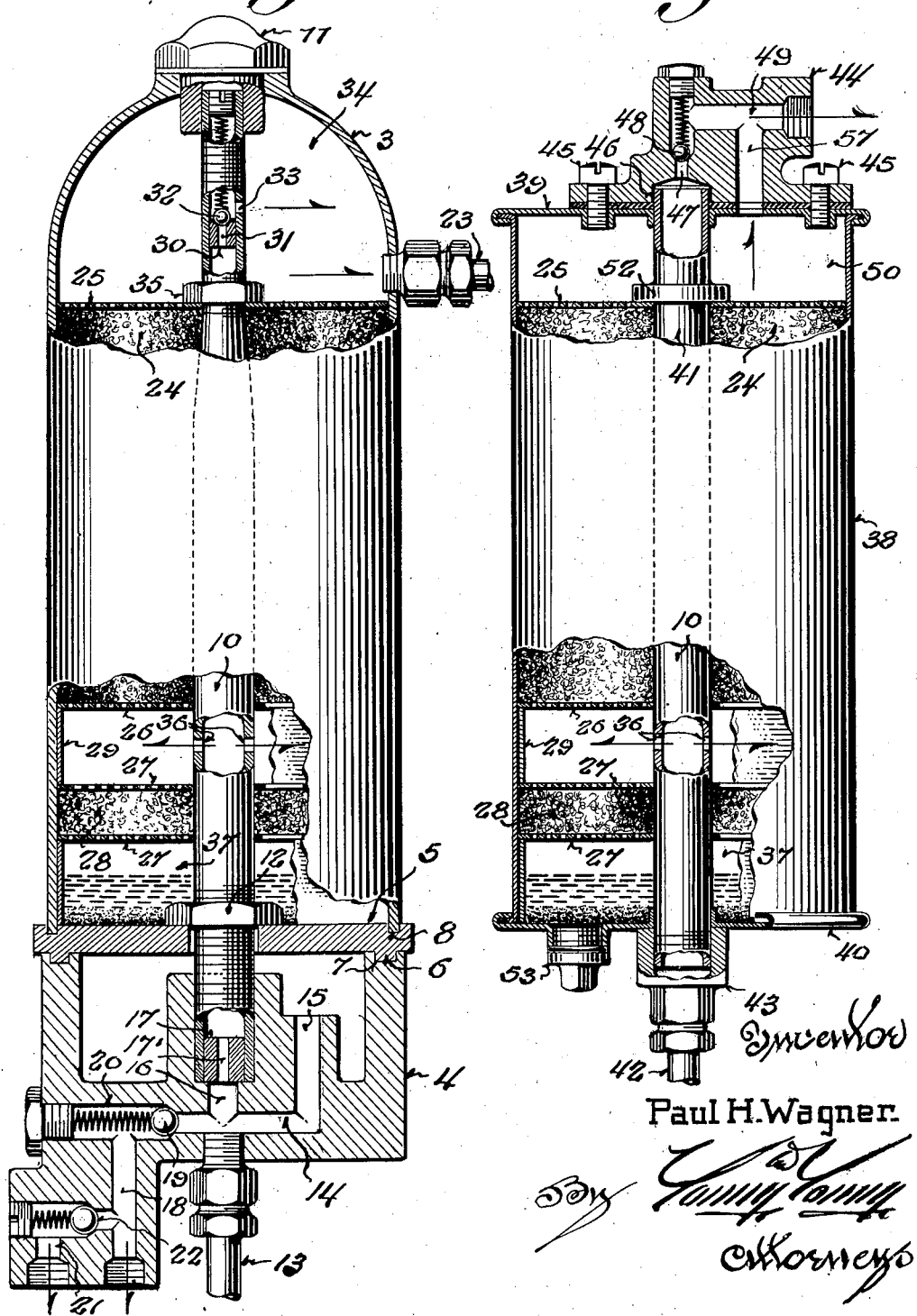
Paul H. Wagner Patented Jan. 30, 1940

2,188,745

UNITED STATES PATENT OFFICE 2,188,745

OIL FILTER

Paul H. Wagner, Milwaukee, Wis.

Application April 20, 1938, Serial No. 203,101

1 Claim. (Cl. 210—140)

This invention pertains to oil filters, and has primarily for its object to provide a comparatively simple, inexpensive, and highly efficient filter, operating upon a novel principle to allow by-passing of oil when in a cold, congealed condition.

Incidental to the foregoing, a more specific object resides in the provision of a filter that permits the cold, congealed oil to pass directly therethrough without passing through the filtering medium, until such time as the oil becomes heated sufficiently to reduce its viscosity, and allow permeation through the filtering medium.

Another important object of the invention is to provide an oil filter having a segregated settling compartment for reception of condensation and other foreign matter of greater specific gravity than the oil.

A still further object is to provide an oil filter, in which the oil has a tendency to flow outwardly as it passes through the filtering material, thereby depositing the sediment and foreign matter at the outer periphery of the filtering material, leaving a comparatively free passage through the interior of the filtering material.

With the above and other objects in view, which will appear as the description proceeds, the invention resides in the novel construction, combination, and arrangemement of parts, substantially as hereinafter described, and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

In the drawing:

Figure 1 is an elevation of an oil filter embodying the principles of the present invention, parts being broken away and in section to more clearly illustrate structural details.

Figure 2 is a similar view of a modified form of the invention.

The principles of the present invention may be variously applied. For instance, in that form illustrated in Figure 1, certain elements are supplied as replacement units for a conventional type of automotive filter now on the market, whereas Figure 2 illustrates a filter designed for original installation.

It is also contemplated that the invention can be embodied in a unit for filtering and reclaiming lubricating oil employed for various industrial purposes. Therefore, while the filters illustrated in the drawing are designed particularly for the automotive field, it is to be understood that the invention is in now way limited in the application of the same.

Referring now more particularly to that form of the invention illustrated in Figure 1, the numeral 3 designates a cylindrical shell, which in conventional filters is designed to fit upon the base 4. However, in converting this type of filter to embody the present invention, an adaptor 5 is provided, the same comprising a circular plate or disc having an annular rib 6 on its lower face for reception in a groove 7 formed in the upper edge of the base 4. The top face of the plate 5 has formed therein an annular groove 8 for reception of the lower edge of the shell 3.

Threaded into the central boss 9 formed in the base 4 is a tube 10, which extends upwardly through the shell for reception of an internally threaded cap screw 11. A nut 12 threaded on the lower portion of the tube 10 engages the plate 5 to lock the same on the base 4, while the cap screw 11 holds the shell 3 in assembled position upon the disc 5.

A supply line 13 from a lubricating pump (not shown) is tapped into the base 1, and communicates with a passage 14, which in turn connects with a duct 15 communicating with the interior of the base 4, and a passage 16 that communicates with the lower end of the tube 10, that is provided with a plug 17 having a restricted orifice 17'.

The base 4 is also provided with an outlet 18, which is connected in the usual manner with a supply line to the main bearings of a motor, and between the outlet 18 and the passage 14 is a ball check 19, normally urged to close position by the spring 20.

An auxiliary outlet 21 communicates with the outlet 18, a spring-urged ball check 22 serving to normally close the communication. The outlet 21 is connected with the crank case of a motor, for the purpose hereinafter set forth.

Tapped into the upper end of the shell 3 is a return line 23, which also leads back to the crank case of the motor, or oil reservoir. Positioned within the shell 3 is a flocculent filtering medium 24 of any suitable material, the same being confined between upper and lower perforated plates 25 and 26 respectively, and positioned below plate 26 are the plates 27, which confine the filtering material 28. The plates 27 are held in spaced relation between the plate 26 and the top of the adaptor 5 by the annular spacers 29.

The upper end of the tube 10 is provided with a plug 30 having a restricted opening 31 closed by a ball check 32. Above the plug 30 the tube 10 is provided with an outlet 33, communicating with the discharge chamber 34, formed in the dome of the shell 3. A nut 35 threaded on the upper end of the tube 10 engages the top perforated plate 25 to hold the filter assembly in position, and between the perforated plate 26 and the adjacent plate 27 the tube is provided with a plurality of openings 36.

From the foregoing explanation it will be seen that the filtering medium disposed between the plates 27 serves as a partition to form a settling compartment 37, which constitutes a quiet zone, undisturbed by the normal flow of lubricant through the filter.

Considering now the operation of that form of the invention heretofore described, as the lubricant enters the base 4, through the supply line 13, in a cold congealed condition, the same will be forced through the restricted orifice 17', due to the fact that the well or compartment formed in the base is closed by the disc 5, and, therefore, after the well is filled with lubricant through the passage 15, it must pass through the plug 17 into the tube 10. Due to the viscosity of the lubricant when cold, the resistance to its passage through the filtering material 24 and 28 is such as to cause the oil to travel upwardly through the tube 10, rather than through the filtering material 24, and then pass through the plug 30 and into the chamber 34 through the opening 33, from which it is returned to the crank case of the motor, or a reservoir, through the line 23.

As the engine continues in operation, and the oil becomes heated sufficiently to reduce its viscosity to the extent that it can be passed upwardly through the filtering material 24, then a normal filtering operation takes place, and here it will be noted that inasmuch as the oil passes upwardly through the filtering material 24, under pressure, the same will have a tendency to flow toward the wall of the shell 3, with the result that sediment and foreign matter will accumulate around the outer periphery of the filtering material 24, and while this will gradually fill toward the center, effective filtering operation continues for a maximum period of service, which only terminates when the filtering material 24 becomes completely filled with sediment or solid matter taken from the oil.

Another vital feature of the present invention resides in the fact that it effectively provides for collecting water or condensation, which is usually present in motor lubricant. This is accomplished by the provision of the segregated compartment 37, which provides a quiet zone outside of the flow of lubricant, thus preventing agitation of the accumulation in the settling chamber, and its return to the motor. In other words, when the motor and fuel pump are stopped, condensation of all foreign matter of greater specific gravity than the lubricant will gradually percolate through the filtering material 28 into the settling chamber 37, and unless confined in the settling chamber, the same is segregated from the normal lubricant flow, which prevents it from being picked up and again carried to the motor bearings.

Here it might be explained that the outlets 18 and 21 are conventional, and form no part of the present invention. The purpose of the check control outlet 18, in the normal operation of the filter in its conventional form, is to supply the bearings of the motor when it is initially started and the lubricant congealed to the extent that it is unable to pass through the filtering medium normally employed. In the event of excess pressure, because of the condition of the lubricant, and the fact that the bearings can only consume a predetermined amount of lubricant, the excess lubricant will pass through the auxiliary outlet 21, and return to the crank case of the motor.

In principle of operation, that form of the invention disclosed in Figure 2 is substantially identical with the form heretofore described, in that the same is designed to pass lubricant directly through the housing without passing through the filter body, when the oil is in a stiff, congealed condition, during which operation the oil is returned to the motor until such time as the same becomes heated sufficiently to permit passage through the main filter body 24, in the manner heretofore described.

The disclosure in Figure 2 is designed for original installation, whereas that form of the invention shown in Figure 1 illustrates the application of the present invention to filters of conventional structure now on the market without the necessity of replacing the entire filter.

In Figure 2 the numeral 38 designates a cylindrical shell or housing having permanently attached upper and lower end closures 39 and 40, respectively, and a central tube 41 secured within the housing and projecting beyond the ends. A supply line 42 is connected with the lower end of the tube 41 by a conventional coupling 43, while a fitting 44 is detachably connected to the upper end 39 by cap screws 45, or any other suitable means. The fitting 44 is provided with a recess 46 for reception of the upper end of the tube 41, and communicating with said recess is a restricted opening 47 controlled by a spring-urged ball check 48.

A discharge passage 49 formed in the fitting communicates with the passage 47, and also with the discharge compartment 50 formed in the upper end of the housing 39 through the duct 51. The discharge opening 49 is connected with a return line to the motor (not shown). A flange or abutment 52 formed on the tube 41 engages the top perforated plate 25, and serves the same function as the nut 35 in locking the filtering elements in assembled position within the housing 38. The bottom of the housing is provided with a drain or clean-out plug 53 for removal of the condensation or other accumulation within the settling chamber 37.

In the foregoing form of the invention, after the filtering material becomes caked and saturated with sediment and foreign matter, to the extent that the lubricant can no longer pass through the same, an entire new shell in which the most effective filtering material is properly assembled in the factory, is supplied to the user, and quickly installed by merely removing the fitting 44, and the coupling 43, which are then attached to the replacement element or shell 38.

In addition to the foregoing, it is also to be understood that instead of supplying the filtering material 24 in loose form, to be packed between the perforated retaining plates in assembling the main filter body, the filtering material may be supplied in fabric or porous sacks secured together at their ends to form a replacement unit when required. In such instance the sack would be of the approximate diameter of the shell, and the desired length, with a central opening for reception of the tubes. Obviously, this arrangement will result in an added convenience in replacing the filtering medium, and at the same time can be economically produced on a production basis by the manufacturer.

Because of the novel principle of operation of the present filter, actual tests have conclusively established several important advantages over conventional types of filters, namely by-passing cold congealed oil upon initial operation of the motor; trapping condensation and sediment present in the oil, in a segregated chamber in a quiet zone outside the path of flow of the lubricant; and causing the lubricant during the filtering operation to flow upwardly and outwardly through the main filtering body, with the result that foreign substance will gradually accumulate at the outer periphery of the filter material, thus leaving an inner path through which the oil may continue to flow until such time as the filtering material is completely saturated and clogged, thus insuring a maximum period of service, and less frequent replacement.

Comparative tests have shown that the present invention not only cleans the lubricant in a minimum period of time, but also maintains it in that condition without the necessity of frequent changes, and in addition to removing sediment and condensation, it has also been found that other objectionable elements, such as perfume, coloring, and so forth, frequently put into lubricating oil by manufacturers, and which are detrimental to the best lubricating qualities of the oil, are also removed, thus insuring most efficient lubrication of motor pistons, bearings, and so forth, with the result that piston rings are as completely sealed as is possible, which prevents oil from passing by the rings to mix with the gasoline and develop carbon, to say nothing of effecting a material economy in the consumption of lubricant.

Having thus described the invention, I claim as follows:

An oil filter comprising a housing having inlet and outlet ports in its lower and upper ends respectively, a tube centrally positioned within said housing and connected with said inlet port, said tube having a restricted communication with said outlet port, a check valve for controlling said restricted communication and a main filter body disposed within said housing and entirely surrounding and filling the space between said tube and housing intermediate the upper and lower ends of the housing, a filtering partition of less mass than the main filter body disposed between the main filtering body and the bottom of the housing to provide a settling chamber, said partition comprising perforated plates with filtering material disposed therebetween, said tube having discharge openings of greater area than the restricted communication between said tube and outlet port and communicating with the compartment formed between the main filter body and the filter partition, and spacers loosely positioned in said housing and disposed between the main filter body, the filtering partition, and the bottom of the housing.

PAUL H. WAGNER.